(No Model.)
B. J. EDWARDS.
PHOTOGRAPHIC CAMERA.
No. 472,257. Patented Apr. 5, 1892.
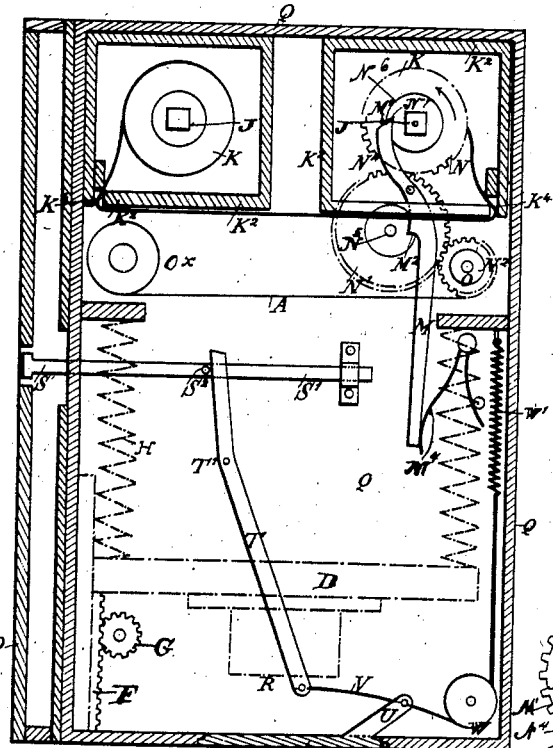
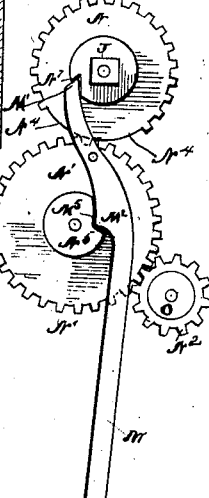
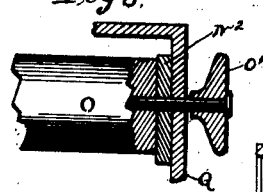
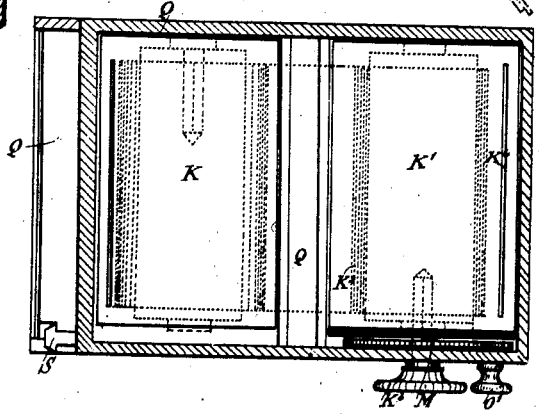
Witnesses
Inventor
B. J. Edwards

UNITED STATES PATENT OFFICE.

BENJAMIN J. EDWARDS, OF LONDON, ENGLAND, ASSIGNOR TO THE EASTMAN COMPANY, OF ROCHESTER, NEW YORK.

PHOTOGRAPHIC CAMERA.

SPECIFICATION forming part of Letters Patent No. 472,257, dated April 5, 1892.

Application filed June 26, 1890. Serial No. 356,826. (No model.) Patented in England July 16, 1889, No. 11,416.

*To all whom it may concern:*

Be it known that I, BENJAMIN JOSEPH EDWARDS, a subject of the Queen of Great Britain, and a resident of the Grove, Hackney, London, in the county of Middlesex, England, at present residing at Paris, in the French Republic, have invented certain new and useful Improvements in Photographic Cameras, (for which I have obtained British Letters Patent No. 11,416, dated July 16, 1889;) and I do hereby declare the following to be a full, clear, and exact description of the same, reference being had to the accompanying drawings, forming a part of this specification.

My present invention has for its objects to provide an improved photographic camera adapted for the use of spools or rolls of flexible sensitized photographic film and employing also a shutter for exposing said film, whereby a new exposure of film may be wound forward and the shutter set for operation simultaneously.

To these and other ends the invention consists in certain novelties of construction and combinations of parts, all as will be hereinafter fully described, and the novel features pointed out particularly in the claims at the end of this specification.

In the drawings, Figure 1 is a sectional view of a camera constructed in accordance with my present invention; Fig. 2, a cross-sectional view taken just in front of the roll-holder and curtain-shutter; Fig. 3, a detail sectional view. Fig. 4 is a diagrammatic view showing the film-winding and shutter-setting gearing.

Similar letters of reference indicate similar parts.

In carrying out my invention I provide a casing Q, provided at the front with an opening, closed in the present instance by a flap or shutter B, hinged at $B^3$, and held normally closed by a spring $W'$, acting on a cord V, attached to an arm U on the inner side of said shutter. Within the casing is arranged a frame D, carrying the lens R, (shown in dotted lines,) and adjustable back and forth for focusing by a rack F and pinion G, as ordinarily, said frame being connected with the interior of the camera by a bellows H, as usual. At the rear of the camera-casing are arranged two removable receptacles $K^2$ $K^2$, each containing a roller K, upon one of which is wound sensitized photographic film, said film being wound from one roller to the other after an exposure has been made on that portion extending between them. These receptacles are provided with slots $K^4$ on one side for the passage of the film, and attached to the roller which is to receive the film is a short length of paper, gummed at the end, which projects through the slot of the receptacle in order to attach it easily to a similar piece of paper or analogous material attached to the sensitive film on the other roller which projects through the other slot, and when these are joined the film may be wound from one roller to the other as the apparatus is used.

In order that the proper quantity of film may be provided for each exposure, I by preference make the rollers or the handle by which they are actuated so that one complete turn will feed the required length of film, and I employ a pawl or ratchet lever, which engages with a notch or catch and prevents the further winding. This method of measuring the quantity of film I find to be accurate enough for practical purposes, though it occasions a slight waste of film. By the use of film-receptacles of this description the sensitized material can be placed in the camera in the light and the film wound from one to the other and exposed between, and then the full receptacle removed, the empty one put in its place, and the piece of paper on the end of the full roller secured to that on the empty one, the film wound forward again, and so on, the operator carrying into the field with him the rolls or packages of film. The ends of the rollers K are provided with sockets adapted for the reception of a winding shaft or key, which in the present construction is represented by J, being secured to or forming part of a handle $K^3$ on the exterior of the casing. This handle is attached to a gear-wheel N, journaled in the casing, and having a number of its teeth cut away at $N^4$, and also having secured to it a wheel $N^6$, provided with a notch $N^7$ for the engagement of a catch or pawl $M'$ on a lever M, pivoted to the side of the casing.

The exposing-shutter, which I prefer to employ on account of its adaptability to the present arrangement of parts, is substantially the same as that contained in Letters Patent No. 452,119, granted me May 5, 1891, consisting of a curtain, represented herein by the letter A, provided with an exposing-aperture, and connected at opposite ends with rollers O and O$^\times$, journaled in the casing, the latter having a spring contained in it, tending to wind the shutter thereon, and the former a gear N$^2$ on its end. The roller O is further provided with a threaded extension projecting to the exterior of the casing, on which is a knob O', adapted to be screwed inward, clamping the roller to the casing for the purpose of holding the exposing-aperture in the shutter in line with the lens-opening to make a time exposure when desired. Meshing with the gear N$^2$ and also with the teeth of gear N is a gear N', provided also with a disk N$^5$, having a shoulder or stop thereon, with which is adapted to engage a stop or tooth M$^2$ on the lever M, the inner end of said lever extending along the side of the camera-casing and acted upon by a spring M$^4$, tending to keep the detents M' and M$^2$ in engagement with their respective wheels.

At the side of the camera-casing is arranged in suitable guides a sliding rod S', having a portion S projecting to the exterior of the casing in convenient position to be moved by the operator, and the inner end of this rod is arranged below the end of trip-lever M, so that when moved up it will move the latter and release the wheels held by it. Also upon this rod is a projection S$^2$, co-operating with a lever T, pivoted at T' and connected to the cord V, attached to the flap-shutter B, so arranged that when rod S' is pushed in the flap will be opened. Assuming an exposure has just been made, the shutter will be wound on the lower roller O$^\times$ by the spring, the teeth of gear N' project into the cut-away portion of gear N, and the lever M is turned on its pivot, the stop M$^2$ resting on the periphery of the disk N$^5$, which does not make quite a full rotation during exposure, and holding end M' out of engagement with the notch N$^7$ of gear N.

The operator, in order to set the camera for another exposure, turns the handle K$^3$ in the direction of arrow, Fig. 1, and winds the film forward. At the same time the teeth of gear N engage N' and rotate the latter and through gear N$^2$ the roller O, causing the shutter A to be wound up against the tension of the spring in roller O$^\times$. Just before the gear N completes its rotation the gear N' rotates far enough to wind up the shutter, and then the stop M$^2$, which is the longer, drops into the notch and prevents its backward movement; but the portion N$^4$ of the gear N being opposite the gear N' the film may be wound forward sufficiently far to bring a new exposure in position, when its further movement will be arrested by the stop M' on the lever M. Now the parts are, as in Fig. 1, in position for making an exposure, to accomplish which the operator, having focused the object, presses the button S, causing first the shutter B to open through lever T, and then the end of rod S' engaging the lever M the shutter A is released, its spring causing it to fall and make the exposure when the aperture passes the lens-opening, the shutter B being returned to normal position when the pressure on button S is removed.

When it is desired to make a time exposure, shutter A is secured by screwing the knob O' up against the casing, it having been moved so that its aperture is in line with the lens, when the exposure may be made by means of shutter B actuating it by the button S.

From the above it will be seen that only two operations are necessary in taking a picture, namely: to first turn the knob K$^3$ as far as it will go, thereby winding a new exposure of film into position and simultaneously setting the shutter, and, secondly, pressing the button S, making the exposure and setting the parts so that another exposure may be made.

It is obvious that other connections may be employed between the shutter and film-winding devices than those herein shown that will accomplish the result of winding the film forward and setting the shutter by an intermittent progressive movement of the actuating mechanism; also, that other forms of shutters than those herein shown could be employed, and I therefore do not desire to be confined to precisely the construction herein shown and described; also, it will be understood that as far as the broad feature of my invention is concerned any roll-holder for holding and feeding the film from rolls or spools is considered the equivalents of the removable boxes herein shown, and such a device could readily be employed instead of the boxes, though I prefer the latter by reason of the facility with which exposed film may be removed and unexposed inserted without resorting to the dark-room.

The feature of causing the feeding of the film and setting of the shutter by a single operation is quite desirable, as there is no opportunity for causing a second exposure of the same portion of film. Aside from this feature, however, the employment of a stop for arresting the film-winding devices and a shutter-actuating device (in the present instance the catch) connected for simultaneous operation prevents the winding of the film until the shutter has been released, if once set.

I do not claim herein the boxes or film-packages described, as they form the subject-matter of a divisional application filed September 24, 1890, Serial No. 366,042.

I claim as my invention—

1. In a camera, the combination, with the film holding and feeding devices and a stop for arresting their movement after a predetermined amount of film has been fed, of an exposing-shutter and a catch for retaining it in set position, said catch being connected to the stop, whereby when the shutter is released and an exposure made the film-feeding devices will be released also, substantially as described.

2. The combination, with the film-feeding devices movable in one direction only, of an exposing-shutter, a catch for retaining it in set position, and connections between the film-winding and the shutter-setting devices, whereby the shutter will first be set and the setting and winding devices disconnected by the continued movement of the latter, substantially as described.

3. The combination, with the film-feeding devices movable in one direction only and a stop for arresting said devices after a predetermined movement, of an exposing-shutter, a catch for retaining it in set position, and connections between the film-winding and shutter-setting devices, whereby the shutter will first be set and the setting and winding devices disconnected by the continued movement of the latter, substantially as described.

4. The combination, with the film-roller, the operating-handle connected thereto, and a stop for arresting the movement of said roller, of an exposing-shutter and a catch for retaining it when set, said catch and stop being connected for simultaneous operation, whereby when the shutter is released the film-roller is unlocked, substantially as described.

5. The combination, with the film-feeding devices and the mutilated gear connected therewith, of the spring-actuated exposing-shutter, the catch for retaining it, and the gear for setting the shutter meshing with the mutilated gear, substantially as described.

6. The combination, with the film-feeding devices and the mutilated gear connected therewith, of the spring-actuated shutter, the setting-gear having the disk provided with the notch and meshing with the mutilated gear, and the catch for co-operating with said disk and having a portion also engaging the film-feeding devices and arresting the same, substantially as described.

7. The combination, with the film-feeding devices and the mutilated gear connected therewith, of the spring-actuated roller blind-shutter, the gear at one end, actuated from the mutilated gear, the disk having the notch, and the catch co-operating with said disk and adapted to engage the film-feeding devices for arresting the same, substantially as described.

8. The combination, with the film-feeding devices, of the spring-actuated shutter, a catch for retaining it, connections between the shutter and feeding devices for causing the simultaneous feeding of the film and setting of the shutter, and another shutter and connections between it and the catch for causing the simultaneous opening of the second shutter and the release of the catch, substantially as described.

B. J. EDWARDS.

Witnesses:
 F. MENNONS,
*Patent Agent, 24 Boulevard des Capucines, Paris.*
 A. PROUST,
  *Clerk to above.*